United States Patent
Quach et al.

(10) Patent No.: US 9,858,637 B1
(45) Date of Patent: Jan. 2, 2018

(54) SYSTEMS AND METHODS FOR REDUCING MOTION-TO-PHOTON LATENCY AND MEMORY BANDWIDTH IN A VIRTUAL REALITY SYSTEM

(71) Applicant: QUALCOMM INCORPORATED, San Diego, CA (US)

(72) Inventors: Nhon Quach, San Jose, CA (US); Moinul Khan, San Diego, CA (US); Maurice Ribble, Lancaster, CA (US); Martin Renschler, San Diego, CA (US); Mehrad Tavakoli, San Diego, CA (US); Rashmi Kulkarni, Menlo Park, CA (US); Ricky Wai Kit Yuen, Saratoga, CA (US); Todd Lemoine, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/253,201

(22) Filed: Aug. 31, 2016

Related U.S. Application Data (60) Provisional application No. 62/368,241, filed on Jul. 29, 2016.

(51) Int. Cl.
  *G06F 3/01* (2006.01)
  *G02B 27/01* (2006.01)
  (Continued)

(52) U.S. Cl.
  CPC .............. *G06T 1/20* (2013.01); *G02B 27/017* (2013.01); *G06F 3/011* (2013.01); *G06F 3/012* (2013.01);
  (Continued)

(58) Field of Classification Search
  None
  See application file for complete search history.

(56) References Cited

U.S. PATENT DOCUMENTS 9,024,972 B1 * 5/2015 Bronder ............... G06T 19/006
    345/633
9,240,069 B1   1/2016 Li
    (Continued)

FOREIGN PATENT DOCUMENTS

WO   2015192117 A1   12/2015

OTHER PUBLICATIONS

Qualcomm, "Making Immersive Virtual Reality Possible in Mobile," Qualcomm Technologies Inc., Presentation, Mar. 2016, pp. 1-16.
(Continued)

*Primary Examiner* — Joni Richer
(74) *Attorney, Agent, or Firm* — Smith Tempel Blaha LLC (57) ABSTRACT

Systems, methods, and computer programs are disclosed for reducing motion-to-photon latency and memory bandwidth in a virtual reality display system. An exemplary method involves receiving sensor data from one or more sensors tracking translational and rotational motion of a user for a virtual reality application. An updated position of the user is computed based on the received sensor data. The speed and acceleration of the user movement may be computed based on the sensor data. The updated position, the speed, and the acceleration may be provided to a warp engine configured to update a rendered image before sending to a virtual reality display based on one or more of the updated position, the speed, and the acceleration.

25 Claims, 6 Drawing Sheets

(51) Int. Cl.
  *G06T 1/20* (2006.01)
  *G06T 19/00* (2011.01)
  *G06F 3/0346* (2013.01)

(52) U.S. Cl.
  CPC ............ *G06F 3/013* (2013.01); *G06F 3/0346* (2013.01); *G06T 19/006* (2013.01)

(56) References Cited

U.S. PATENT DOCUMENTS

| | | | | |
|---|---|---|---|---|
| 2003/0005250 A1* | 1/2003 | Johnson | .............. | G06F 13/1689 711/167 |
| 2006/0028400 A1* | 2/2006 | Lapstun | ................ | G02B 26/06 345/8 |
| 2009/0024972 A1 | 1/2009 | Arsovski et al. | | |
| 2009/0240069 A1 | 9/2009 | Keri et al. | | |
| 2010/0091031 A1* | 4/2010 | Tsujimoto | ............ | G02B 27/017 345/589 |
| 2011/0242427 A1* | 10/2011 | Ramsdale | ........... | G06F 15/7807 348/714 |
| 2015/0179130 A1* | 6/2015 | Smadi | .................... | G09G 5/006 345/520 |
| 2015/0205132 A1* | 7/2015 | Osterhout | .......... | G02B 27/0172 345/633 |
| 2015/0370322 A1* | 12/2015 | Gustafson | ............ | G06F 3/1423 345/156 |
| 2016/0035139 A1 | 2/2016 | Fuchs et al. | | |
| 2016/0110919 A1 | 4/2016 | Hancock et al. | | |
| 2016/0253044 A1* | 9/2016 | Katz | ....................... | G06F 3/017 |

OTHER PUBLICATIONS

Qualcomm: "Making Immersive Virtual Reality Possible in Mobile", Qualcomm Technologies, Inc, Mar. 2016, pp. 1-17.

* cited by examiner

SYSTEMS AND METHODS FOR REDUCING MOTION-TO-PHOTON LATENCY AND MEMORY BANDWIDTH IN A VIRTUAL REALITY SYSTEM

PRIORITY CLAIM AND CROSS-REFERENCE TO RELATED APPLICATION

This patent application claims priority under 35 U.S.C. § 119(e) to U.S. Provisional Application Ser. No. 62/368,241, filed Jul. 29, 2016, entitled, "SYSTEMS AND METHODS FOR REDUCING MOTION-TO-PHOTON LATENCY AND MEMORY BANDWIDTH IN A VIRTUAL REALITY SYSTEM," the entire contents of which are hereby incorporated by reference.

DESCRIPTION OF THE RELATED ART

Motion-to-photon (M2P) latency or delay is a critical performance metric in virtual reality (VR) systems. M2P latency is the time delay from a user's movement (e.g., head, eyes, or other body parts) to the time when a virtual reality scene is updated on a display. For example, if it takes 50 ms to reflect a user's movement on the display when the user moves his head to the left/right with a head-mount display (HMD), the 50 ms is the M2P latency of the virtual reality system. High M2P latency provides a poor virtual reality experience and may even cause motion sickness and nausea because when the user makes a movement the mind expects the display to be updated to reflect that action. When the display lags behind the user movement, the user may experience disorientation and motion sickness. Low M2P latency is necessary to convince the virtual reality user that they are in another place (referred to as "presence"). Presence is the state in which the virtual reality user feels as though they are in the computer-simulated world. Research has shown that with an HMD, presence in a virtual reality system may be achieved when the M2P latency is below approximately 20 ms.

Existing VR systems reduce M2P latency using a graphics rendering technique referred to as "time warp", "reprojection", or "rerendering" (collectively referred to as "time warp"). Time warp involves warping the rendered image before sending it to the display to correct for the user's movement that occurred after the rendering. Time warp may reduce latency and increase or maintain frame rate (i.e., the number of frames display per second (fps)). This process takes an already rendered image, modifies it with the predicted positional information based on the collected positional information obtained from sensors (e.g., sensor(s) housed in a HMD), and then displays the modified image on the VR display.

Without time warp, the VR system would capture the data about the position of the user, render the image based on this positional data, and then display the image when the next scene is due. For example, in a 60 frames per second (fps) VR application, a new scene may be displayed once every 16.7 ms. Each image that is displayed is based on the positional data that was obtained approximately 16.7 ms ago. With time warp, however, the HMD captures the positional data, renders the image based on the positional data, and before displaying the image the HMD captures updated positional data. Using the updated positional data, the rendered image is modified with appropriate algorithms to fit the latest position of the user, and then displayed to the user. In this manner, the modified image is more recent and more accurately reflects the position of the user at the time of the display than the image that was initially rendered.

Existing VR systems, however, have several limitations that can make it problematic to optimally minimize M2P latency. When implementing time warp, the positional data typically needs to be manipulated by various intermediate units, taking multiple hops to and from double data rate (DDR) memory, before getting to the graphics processing unit (GPU) for rendering. For example, intermediate positional data may be processed by an intermediate front end (IFE) and stored in the DDR memory. A sensor processing component and/or a processing device may access the intermediate positional data, calculate a position, store the calculated position in the DDR memory, and provide the calculated position to the VR application, a GPU command buffer, a warp engine, etc. These multiple hops to and from DDR memory increases the processing latency and can limit the ability to minimize M2P latency.

Another limitation in existing VR systems is in the lack of available DDR memory. To simulate virtual reality, the display resolution needs to be at very high resolution (e.g., 8K pixels per eye) and frame rate (e.g., 120 Hz). Both factors significantly increase DDR bandwidth demands in the system. To alleviate these problems, existing solutions may resort to graphics rendering techniques, such as foveated rendering.

Accordingly, there is a need for improved systems and methods for reducing M2P latency and DDR bandwidth demands in VR systems.

SUMMARY OF THE DISCLOSURE

Systems, methods, and computer programs are disclosed for reducing motion-to-photon latency and DDR memory bandwidth in a virtual reality display system. An exemplary method involves receiving sensor data from one or more sensors tracking translational and rotational motion of a user for a virtual reality application. An updated position of the user is computed based on the received sensor data. The speed and acceleration of the user movement may be computed based on the sensor data. The updated position, the speed, and the acceleration may be provided to a hardware warp engine configured to update a rendered image before sending to a virtual reality display based on one or more of the updated position, the speed, and the acceleration.

Another embodiment is a computer system comprising one or more sensors for tracking translational and rotational motion of a user. The computer system includes a virtual reality application executed by a processing device. A graphic processing unit (GPU) displays rendered images associated with the virtual reality application. A dedicated sensor processing component is electrically coupled to the one or more sensors and the GPU. The dedicated sensor processing component receives sensor data from the one or more sensors and, based on the sensor data, computes an updated position and a speed and acceleration of the user. The dedicated sensor processing component feeds the updated position, the speed, and the acceleration to a warp engine associated with the GPU.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," "engine", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
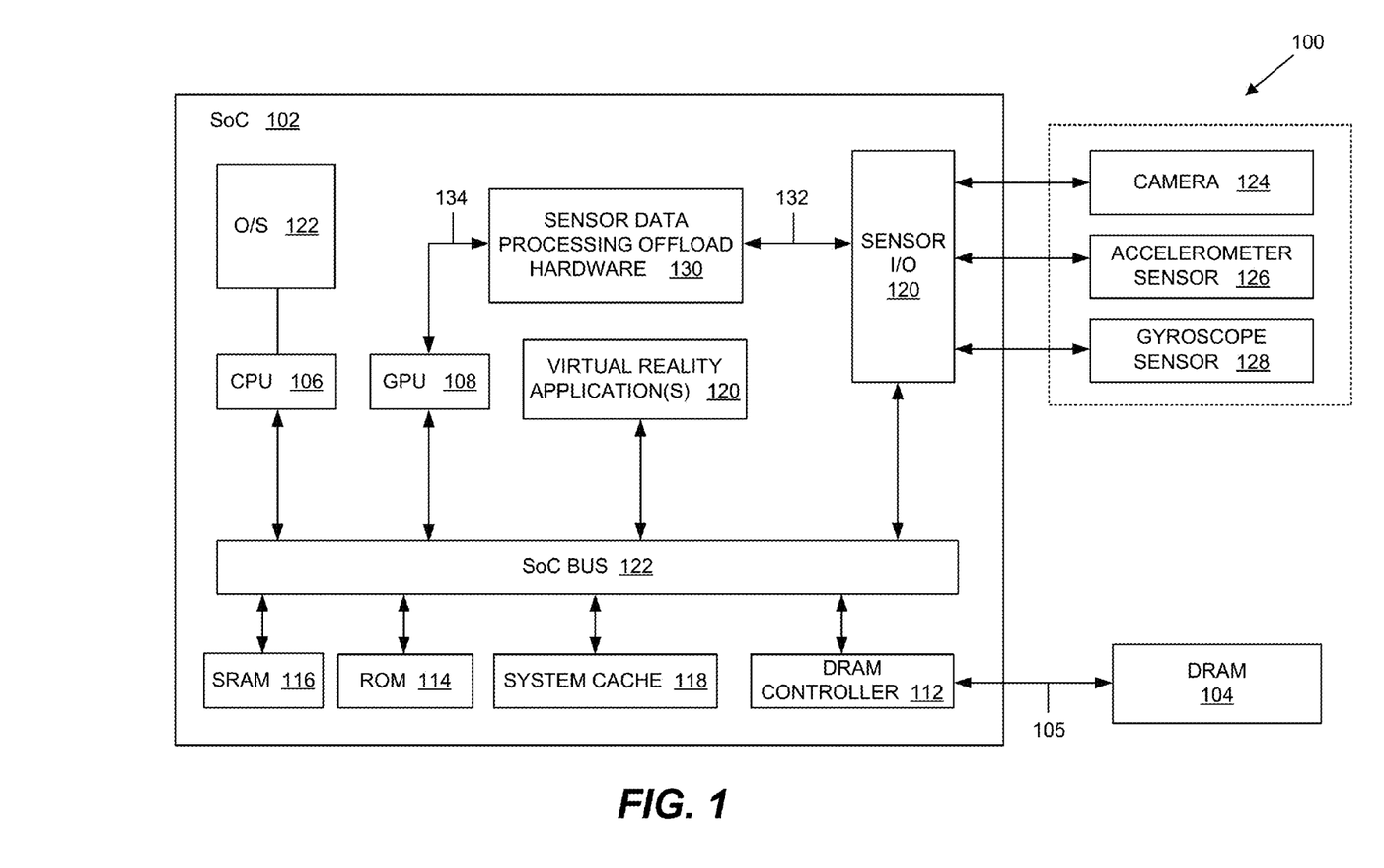
FIG. 1 is a block diagram of an embodiment of a system for reducing motion-to-photon latency and DDR bandwidth in a virtual reality system.
Figure 2:
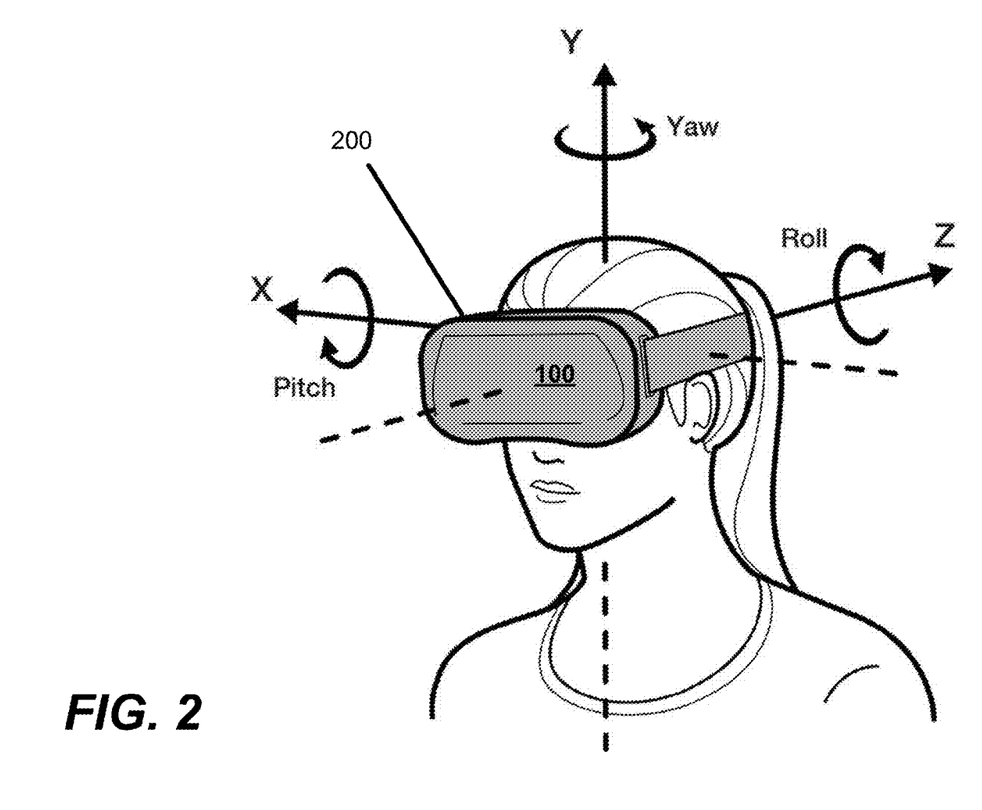
FIG. 2 illustrates an embodiment of a head-mount virtual reality display for incorporating the system of FIG. 1.

FIG. 1 illustrates an embodiment of a system 100 for reducing motion-to-photo (M2P) latency and double data rate (DDR) bandwidth demands in a virtual reality system. It should be appreciated that the system 100 may be implemented in various types of virtual reality systems (e.g., headsets, goggles, eyewear, external VR display(s), projection systems, etc.). As illustrated in the embodiment of FIG. 2, the system 100 may be incorporated in an integrated headmount display (HMD) 200 that is worn by a user. In other embodiments, some of components in the system 100 may be integrated into the HMD 200 while others may be provided by an external processing system (e.g., a portable computing device) or external display (e.g., a computer display, a projection display, etc.).

As illustrated in FIG. 1, the system 100 comprises a system on chip (SoC) 102 electrically coupled to one or more sensors and a memory system via a memory bus. In the embodiment of FIG. 1, the memory system comprises a dynamic random access memory (DRAM) 104 coupled to the SoC 102 via a random access memory (RAM) bus (e.g., a double data rate (DDR) bus 105). The sensors may comprise a camera 124, an accelerometer sensor 126, and a gyroscope sensor 128, each of which may be electrically coupled to a sensor input/output (I/O) component 120 residing in the SoC 102. As illustrated in FIG. 2, the sensor(s) enable the system 100 to track the rotational and translational movement of a user (e.g., the user's head, eyes, and/or other body parts) within three-dimensional space using six degrees of freedom (6DOF). As known in the art, the term 6DOF refers to the freedom of movement of the user in three-dimensional space. The sensors track motion as forward/backward (surge), up/down (heave), left/right (sway) translation in three perpendicular axes, combined with changes in orientation through rotation about three perpendicular axes (i.e., pitch, yaw, and roll).

While various types, configurations, and numbers of sensors may be implement in the system 100, one or more cameras 124 may track eye movements. One or more accelerometer sensors 126 may sense changes in the magnitude and/or direction of the proper acceleration of the user's head and/or other body parts. One or more gyroscope sensors 128 may be used to track angular motion of the user's head and/or other body parts.

As illustrated in FIG. 1, the SoC 102 comprises a central processing unit (CPU) 106, a graphics processing unit (GPU) 108, one or more virtual reality application components 120, a DRAM controller 112, a system cache 118, a static random access memory (SRAM) 116, a read only memory (ROM) 114, and the sensor I/O 120 interconnected via a SoC bus 122. The system 100 includes a high-level operating system (HLOS) 122.

The virtual reality application component(s) 120 may be implemented as a dedicated processing device (e.g., an application digital signal processor (ADSP)) for providing the virtual reality environment. In other embodiments, the virtual reality application(s) 120 may comprise software executing on the CPU 106 and the GPU 108. It should be appreciated that the virtual reality environment may be designed for any desirable purposes, including, for example, video gaming, entertainment, design applications, training simulation, industrial applications, etc.

The DRAM controller 112 controls the transfer of data over DDR bus 105. System cache 118 is a component that stores data so future requests for that data can be served faster. In an embodiment, the system cache 118 may comprise a multi-level hierarchy (e.g., L1 cache, L2 cache, etc.) with a last-level cache that is shared among a plurality of memory clients on the SoC 102.

As illustrated in FIG. 1, the system 100 further comprises a sensor data processing offload hardware component 130. The sensor data processing offload hardware component 130 comprises a dedicated hardware unit configured to offload processing of the sensor data. It should be appreciated that the offloading of the sensor data processing to a dedicated hardware unit may reduce M2P latency and DDR bandwidth demands by providing an optimized sensor data flow pipeline from the tracking sensors to the GPU 108 via the sensor data processing offload hardware component 130. The optimized sensor data flow pipeline comprises a direct feed 132 from the tracking sensors (e.g., camera 124, accelerometer sensor 126, gyroscope sensor 128 via sensor I/O 120) and a direct feed to the GPU 108.

Figure 3:
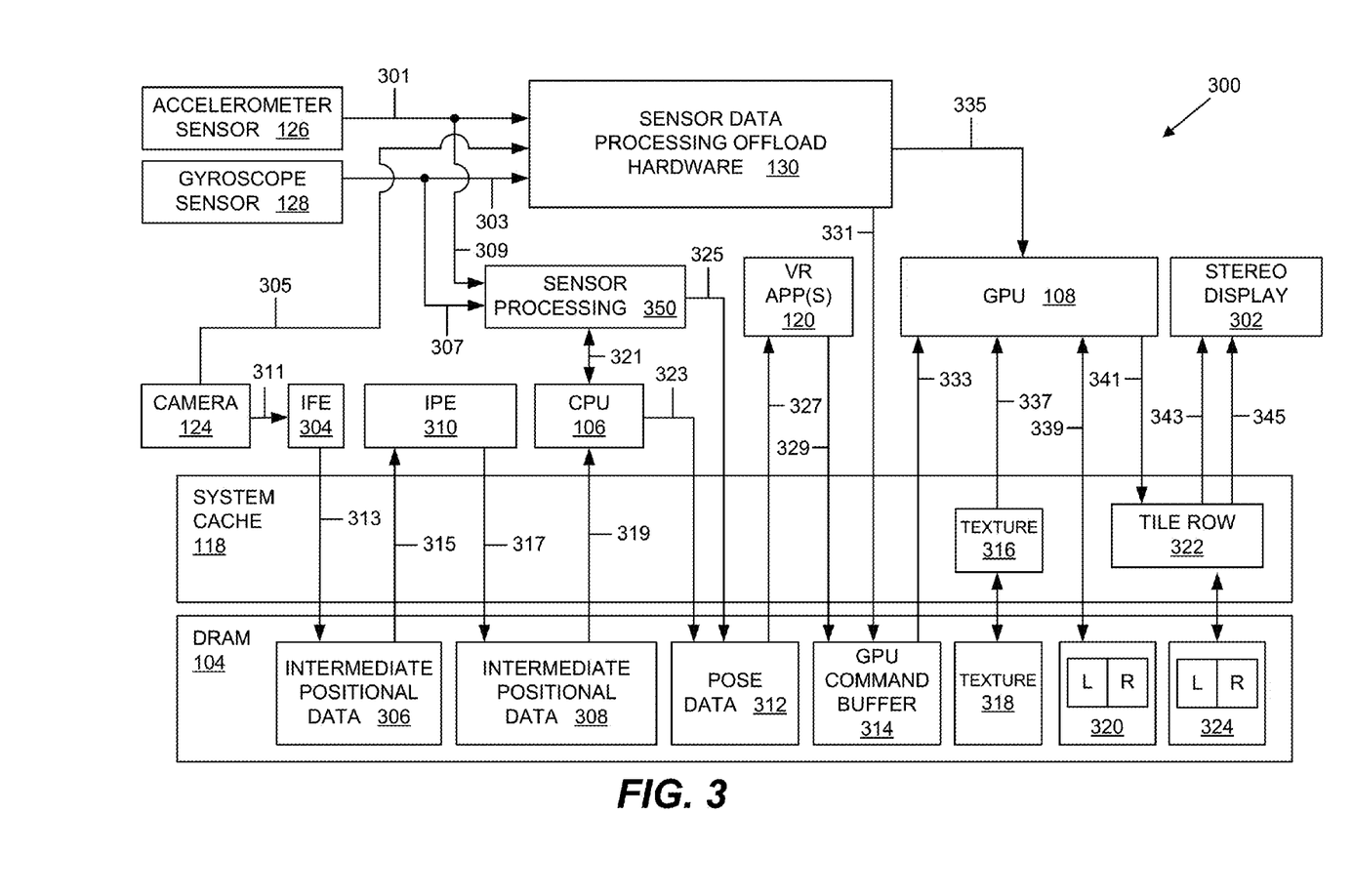
FIG. 3 illustrates an embodiment of the data flow in the virtual reality system of FIG. 1.

FIG. 3 illustrates an embodiment of a sensor data flow pipeline 300 for reducing M2P latency and DDR bandwidth demands in the virtual reality system 100. The sensor data processing offload hardware component 130 may receive raw sensor data from the accelerometer sensor 126, the gyroscope sensor 128, and the camera 124 via interfaces 301, 303, and 305, respectively. The sensor data processing offload hardware component 130 comprises a computation engine for processing the sensor data. The raw sensor data from the camera 124, the accelerometer sensor 126, and the gyroscope sensor 128 may be converted into translational and rotational coordinates. Speed and acceleration information may be computed based on the data received from the gyroscope sensor 128 and/or the accelerometer sensor 126. In this manner, it should be appreciated that the computation engine determines updated positional information, as well as, speed and acceleration data that may be provided to a warp engine. The speed and acceleration data may be used to more accurately predict the user's position. For example, with speed and acceleration data, the warp engine can predict where the user will be at the time of update. The warp engine may use the speed data along with eye-tracking information to adjust the rendering resolution. For example, if the user's head (or the eyes) are moving fast enough (e.g., past a certain threshold—100 degrees/second), then rendering may be performed at a lower resolution to minimize DDR bandwidth.

As illustrated in FIG. 3, the sensor data processing offload hardware component 130 may directly feed the updated positional information, the speed data, and/or the acceleration data to a GPU command buffer 314 (reference numeral 331) residing in DRAM memory 104. As known in the art, the GPU command buffer 314 provides commands to the GPU 108 for displaying the rendered images on the stereo display 302. If the GPU 108 includes a hardware warp engine, the sensor data processing offload hardware component 130 may bypass the command buffer 314 by directly feeding the updated positional information, the speed data, and/or the acceleration data to the GPU 108 (reference numeral 335). The virtual reality application(s) 120 interface with the command buffer 314 (reference numeral 329).

The GPU 108 may implement a texture process (block 316) to generate a multiview rendered image 320 (reference numerals 337 and 339). The GPU 108 may also implement a tile row process (block 322) for generating a post-processed image 324 (reference numeral 343). The post-processed image 324 is presented on the display 302 (reference numerals 343 and 345).

As further illustrated in FIG. 1, the system 100 may implement conventional sensor processing via sensor processing component 350. In this case, the sensor data will be written into the DRAM memory 104. The sensor data will then be retrieved and processed by the sensor data processing block 350 (FIG. 3) to generate the positional and rotational information, which is then written back into the DRAM memory 104 for later consumption by the VR application(s) 120 or CPU 106 (FIG. 3). It should be appreciated that the sensor data processing may involve reading and writing into the DRAM memory 104 multiple times. As further illustrated in FIG. 3, the camera data is processed by the IFE (imaging front-end) 304 block and then IPE (imaging post-processing engine) block 310 before being consumed by the CPU 106 or VR application(s) 120.

Figure 4:
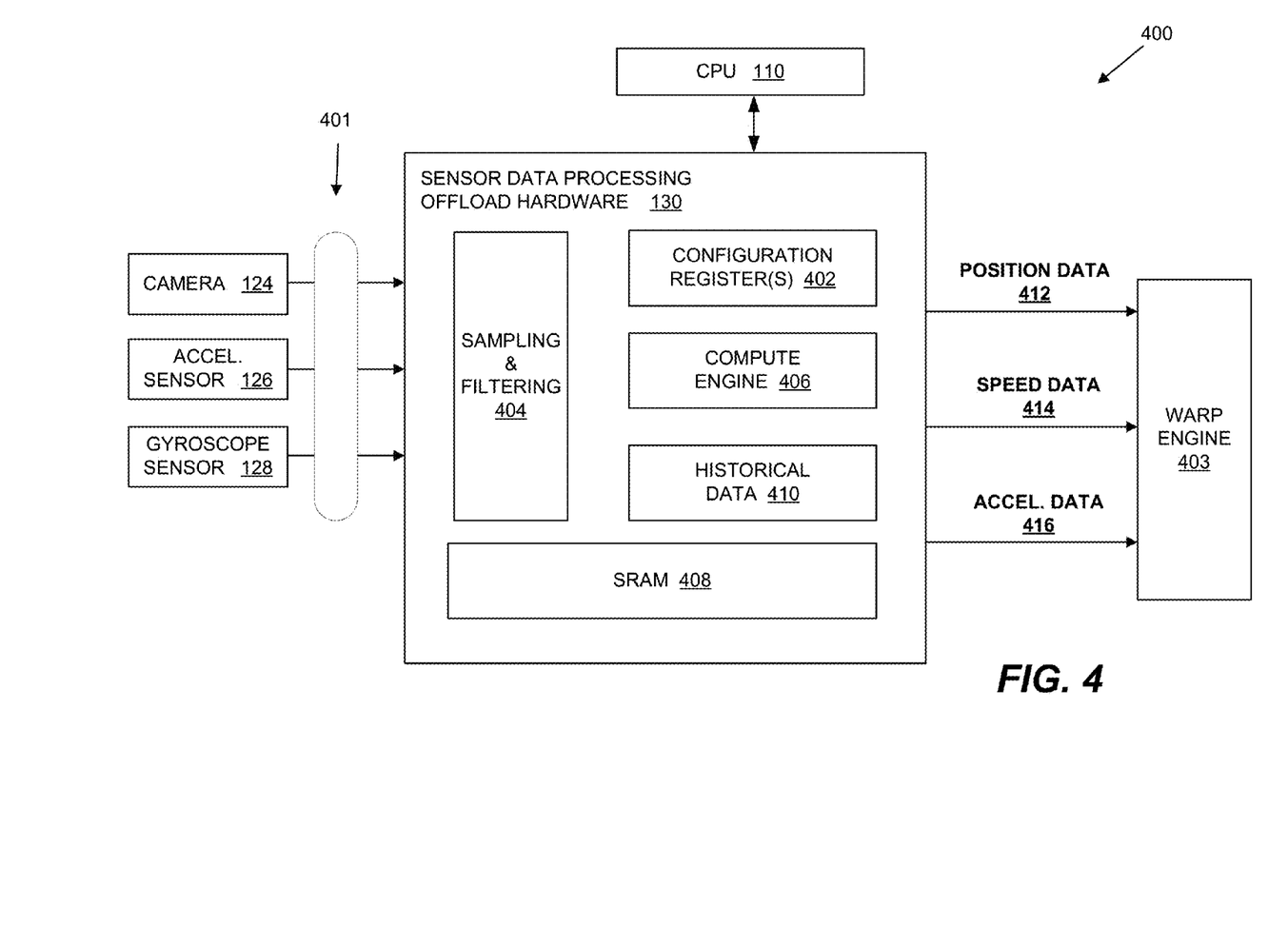
FIG. 4 illustrates the components and inputs/outputs of an exemplary embodiment of the sensor data processing offload hardware in FIG. 1.

FIG. 4 illustrates the components and inputs/outputs of an exemplary embodiment of the sensor data processing offload hardware 130. In this embodiment, the sensor data processing offload hardware 130 comprises a sampling/filtering component 404, configuration register(s) 402, a compute engine 406, and a memory (e.g., SRAM 408). The CPU 106 may control and/or program aspects of the sensor data processing offload hardware 130 via configuration register(s) 402. SRAM 408 may store historical positional, speed, and acceleration data, which may enhance the compute engine 406. The sampling/filtering component 404 receives the raw sensor data 401 from the camera 124, the accelerometer sensor 126, and the gyroscope sensor 128. The sampling/filtering component 404 may reduce the noise in the raw sensor data 401. It should be appreciated that based on the filtered position information, the compute engine 406 may execute various algorithms to generate the speed data 414, and/or the acceleration 416 provided to the warp engine 403. These algorithms include taking simple first or second derivative of the positional data to create the speed and acceleration data, respectively.

Figure 5:
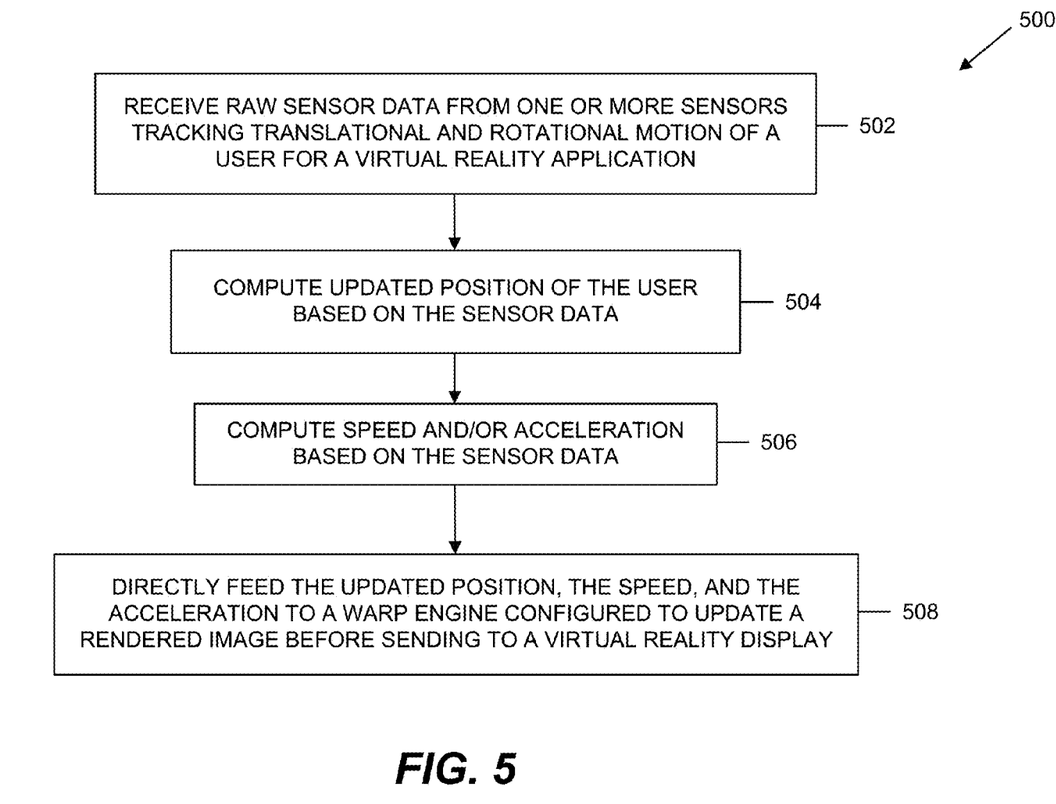
FIG. 5 is a flowchart illustrating an embodiment of a method implemented in the system of FIG. 1 for reducing motion-to-photon latency and DDR bandwidth.

FIG. 5 illustrates an embodiment of a method 500 implemented in the system 100 for reducing motion-to-photon latency and DDR bandwidth. At block 502, the raw sensor data 401 is received from one or more sensors (e.g., the camera 124, the accelerometer sensor 126, and the gyroscope sensor 128) tracking the transitional and rotational motion of a virtual reality user. At block 504, the sensor data processing offload hardware 130 computes the updated position data for the user based on the received sensor data. The sensor data processing offload hardware 130 may also compute speed and acceleration data based on the received sensor data (block 506). At block 508, the sensor data processing offload hardware 130 may directly feed the updated position, the speed, and/or the acceleration to the warp engine 403.

Figure 6:
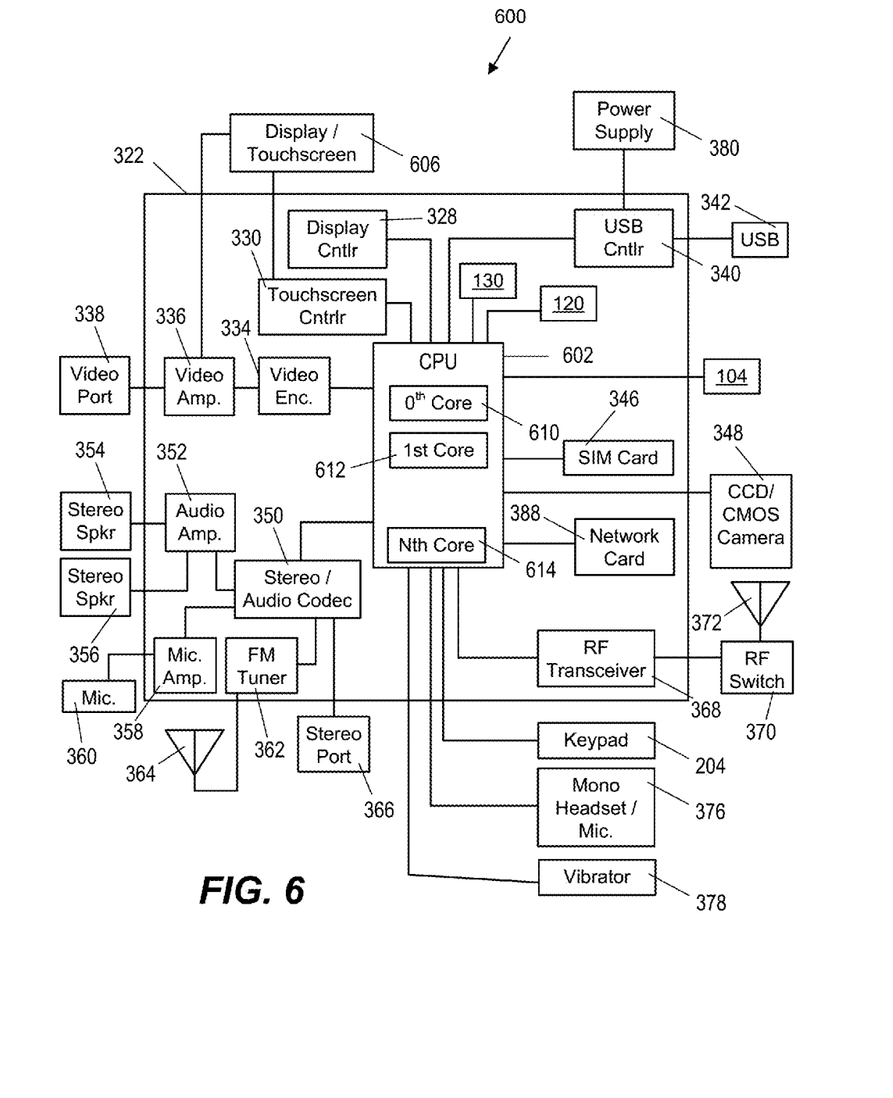
FIG. 6 is a block diagram of an embodiment of a portable computing device for implementing certain aspects of the virtual reality system of FIG. 1.

As mentioned above, the system 100 may be incorporated into any desirable computing system. FIG. 6 illustrates an embodiment in which one or more components of the virtual reality system 100 are incorporated in an exemplary portable computing device (PCD) 600. PCD 600 may comprise a smartphone, a tablet computer, a wearable device (e.g., HMD 200). It will be readily appreciated that certain components of the system 100 (e.g., sensor data processing offload hardware 130 and virtual reality applications 120) are included on the SoC 322 (FIG. 6) while other components (e.g., the DRAM 104) are external components coupled to the SoC 322. The SoC 322 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 328 and a touch screen controller 330 may be coupled to the CPU 602. In turn, the touch screen display 506 external to the on-chip system 322 may be coupled to the display controller 328 and the touch screen controller 330.

FIG. 6 further shows that a video encoder 334, e.g., a phase alternating line (PAL) encoder, a sequential color a memoire (SECAM) encoder, or a national television system(s) committee (NTSC) encoder, is coupled to the multicore CPU 602. Further, a video amplifier 336 is coupled to the video encoder 334 and the touch screen display 606. Also, a video port 338 is coupled to the video amplifier 336. As shown in FIG. 6, a universal serial bus (USB) controller 340 is coupled to the multicore CPU 602. Also, a USB port 342 is coupled to the USB controller 340. Memory 104 and a subscriber identity module (SIM) card 346 may also be coupled to the multicore CPU 502.

Further, as shown in FIG. 6, a digital camera 348 may be coupled to the multicore CPU 602. In an exemplary aspect, the digital camera 348 is a charge-coupled device (CCD) camera or a complementary metal-oxide semiconductor (CMOS) camera.

As further illustrated in FIG. 6, a stereo audio coder-decoder (CODEC) 350 may be coupled to the multicore CPU 602. Moreover, an audio amplifier 352 may be coupled to the stereo audio CODEC 350. In an exemplary aspect, a first stereo speaker 354 and a second stereo speaker 356 are coupled to the audio amplifier 352. FIG. 6 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 6 further illustrates that a radio frequency (RF) transceiver 368 may be coupled to the multicore CPU 602. An RF switch 370 may be coupled to the RF transceiver 368 and an RF antenna 372. A keypad 204 may be coupled to the multicore CPU 602. Also, a mono headset with a microphone 376 may be coupled to the multicore CPU 602. Further, a vibrator device 378 may be coupled to the multicore CPU 602.

FIG. 6 also shows that a power supply 380 may be coupled to the on-chip system 322. In a particular aspect, the power supply 380 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 6, the touch screen display 606, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method reducing motion-to-photon latency and memory bandwidth in a virtual reality display system, the method comprising:
   receiving, by a dedicated sensor processing component, sensor data directly from one or more sensors tracking translational and rotational motion of a user for a virtual reality application;
   computing, by the dedicated sensor processing component, an updated position of the user based on the sensor data;
   computing, by the dedicated sensor processing component, a speed and an acceleration of the user based on the sensor data; and
   providing, by the dedicated sensor processing component, the updated position, the speed, and the acceleration directly to a command buffer associated with a graphics processing unit (GPU) and to a warp engine implemented by the GPU, the GPU configured to update a rendered image before sending to a virtual reality display based on one or more of the updated position, the speed, and the acceleration.

2. The method of claim 1, wherein providing the updated position, the speed, and the acceleration directly to a command buffer comprises providing the updated position, the speed, and the acceleration to a double data rate (DDR) memory having the command buffer.

3. The method of claim 1, wherein the one or more sensors comprise a camera, an accelerometer, and a gyroscope sensor.

4. The method of claim 3, wherein a dedicated hardware device receives the sensor data directly from the camera, the accelerometer, and the gyroscope sensor.

5. The method of claim 1, wherein the warp engine is further configured to adjust a rendering resolution based on one of the speed and the acceleration.

6. The method of claim 1 implemented in a headmount virtual reality device.

7. A system for reducing motion-to-photon latency and memory bandwidth in a virtual reality display system, the system comprising:
   means for receiving sensor data directly from one or more sensors tracking translational and rotational motion of a user for a virtual reality application;
   means for computing an updated position of the user based on the sensor data;
   means for computing a speed and an acceleration of the user based on the sensor data; and
   means for providing the updated position, the speed, and the acceleration directly to a command buffer associated with a graphics processing unit (GPU) and to a warp engine implemented by the GPU, the GPU configured to update a rendered image before sending to a virtual reality display based on one or more of the updated position, the speed, and the acceleration.

8. The system of claim 7, wherein the command buffer is stored in double data rate (DDR) memory.

9. The system of claim 7, wherein the one or more sensors comprise a camera, an accelerometer, and a gyroscope sensor.

10. The system of claim 9, wherein the means for receiving the sensor data comprises a dedicated hardware unit coupled to the camera, the accelerometer, and the gyro sensor.

11. The system of claim 7, wherein the warp engine is further configured to adjust a rendering resolution based on one of the speed and the acceleration.

12. The system of claim 7 implemented in a headmount virtual reality device.

13. A non-transitory computer-readable medium having stored thereon in computer-executable form instructions that when executed by a processing device implement a method for reducing motion-to-photon latency and memory bandwidth in a virtual reality display system, the method comprising:
   receiving, by a dedicated sensor processing component, sensor data directly from one or more sensors tracking translational and rotational motion of a user for a virtual reality application;
   computing, by the dedicated sensor processing component, an updated position of the user based on the sensor data;
   computing, by the dedicated sensor processing component, a speed and an acceleration of the user based on the sensor data; and
   providing, by the dedicated sensor processing component, the updated position, the speed, and the acceleration directly to a command buffer associated with a graphics processing unit (GPU) and to a warp engine implemented by the GPU, the GPU configured to update a rendered image before sending to a virtual reality display based on one or more of the updated position, the speed, and the acceleration.

14. The non-transitory computer-readable medium of claim 13, wherein providing the updated position, the speed, and the acceleration directly to the command buffer comprises providing the updated position, the speed, and the acceleration to a double data rate (DDR) memory having the command buffer.

15. The non-transitory computer-readable medium of claim 13, wherein the one or more sensors comprise a camera, an accelerometer, and a gyro sensor.

16. The non-transitory computer-readable medium of claim 15, wherein a dedicated hardware device receives the sensor data directly from the camera, the accelerometer, and the gyro sensor.

17. The non-transitory computer-readable medium of claim 13, wherein the warp engine is further configured to adjust a rendering resolution based on one of the speed and the acceleration.

18. The non-transitory computer-readable medium of claim 13 implemented in a headmount virtual reality device.

19. A computer system for reducing motion-to-photon latency in a virtual reality display system, the computer system comprising:
   one or more sensors for tracking translational and rotational motion of a user;
   a virtual reality application executed by a processing device;
   a graphics processing unit (GPU) for displaying rendered images associated with the virtual reality application; and
   a dedicated sensor processing component electrically coupled to the one or more sensors and the GPU, the dedicated sensor processing component configured to:
     receive sensor data directly from the one or more sensors;
     compute an updated position of the user based on the sensor data;
     compute a speed and an acceleration of the user based on the sensor data; and feed the updated position, the speed, and the acceleration directly to a command buffer associated with the GPU and to a warp engine implemented by the GPU; and update, by the GPU, a rendered image before sending to a virtual reality display based on one or more of the updated position, the speed, and the acceleration.

20. The computer system of claim 19, wherein the command buffer is stored in a double data rate (DDR) memory.

21. The computer system of claim 19, wherein the one or more sensors comprise a camera, an accelerometer, and a gyro sensor each of which are electrically coupled to the dedicated sensor processing component.

22. The computer system of claim 19, wherein the warp engine is configured to adjust a rendering resolution based on one of the speed and the acceleration.

23. The computer system of claim 19, wherein the virtual reality application, the GPU, and the dedicated sensor processing component reside on a system on chip (SoC) electrically coupled to a double data rate (DDR) memory, and the command buffer is stored in the DDR memory.

24. The computer system of claim 19, wherein the dedicated sensor processing component comprises a central processing unit (CPU).

25. The computer system of claim 19 incorporated in a headmount virtual reality device.

* * * * *